May 14, 1957 R. A. PETERSON 2,792,068
GEOPHYSICAL PROSPECTING SYSTEM
Filed May 6, 1953 5 Sheets-Sheet 2
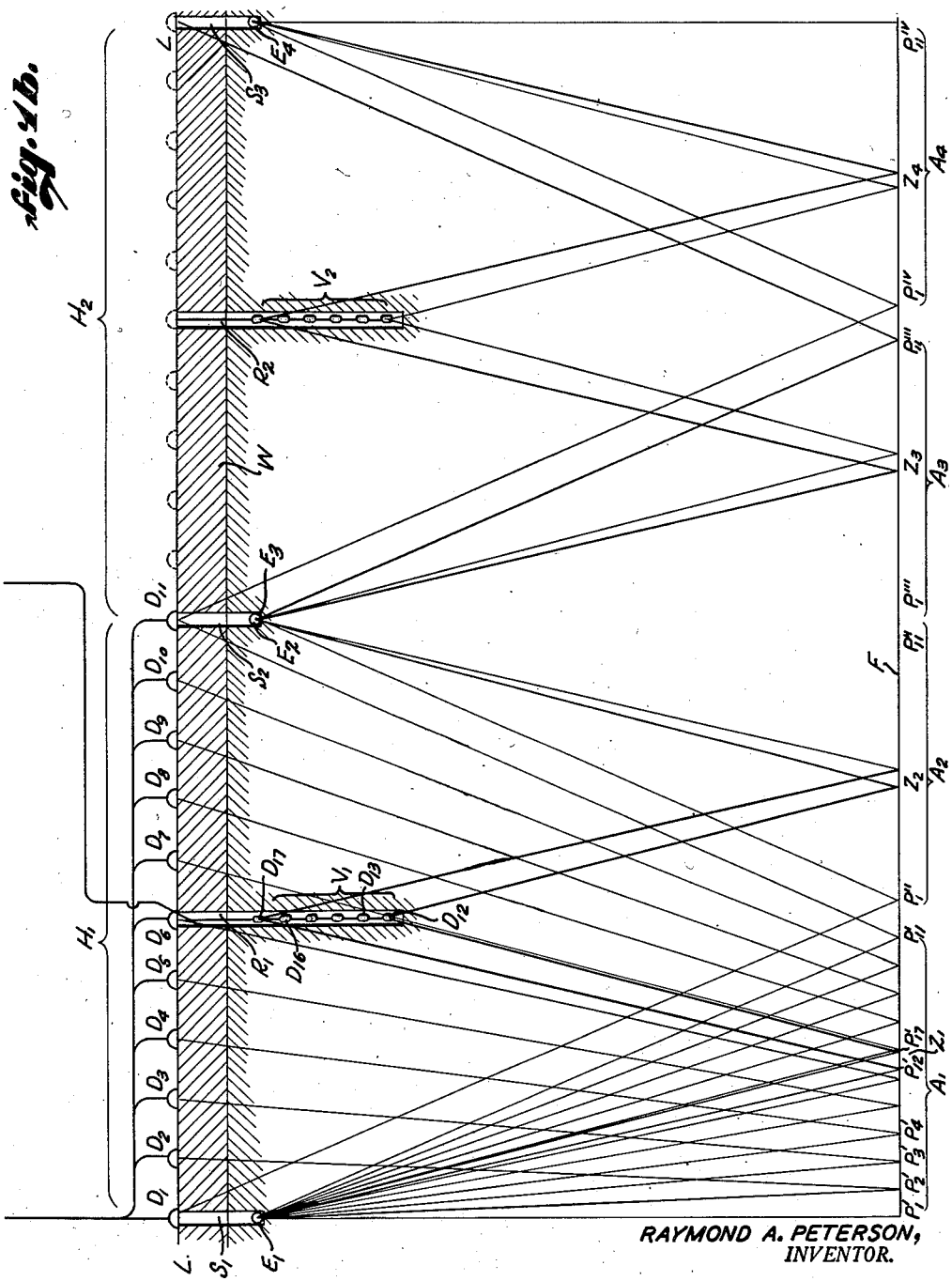

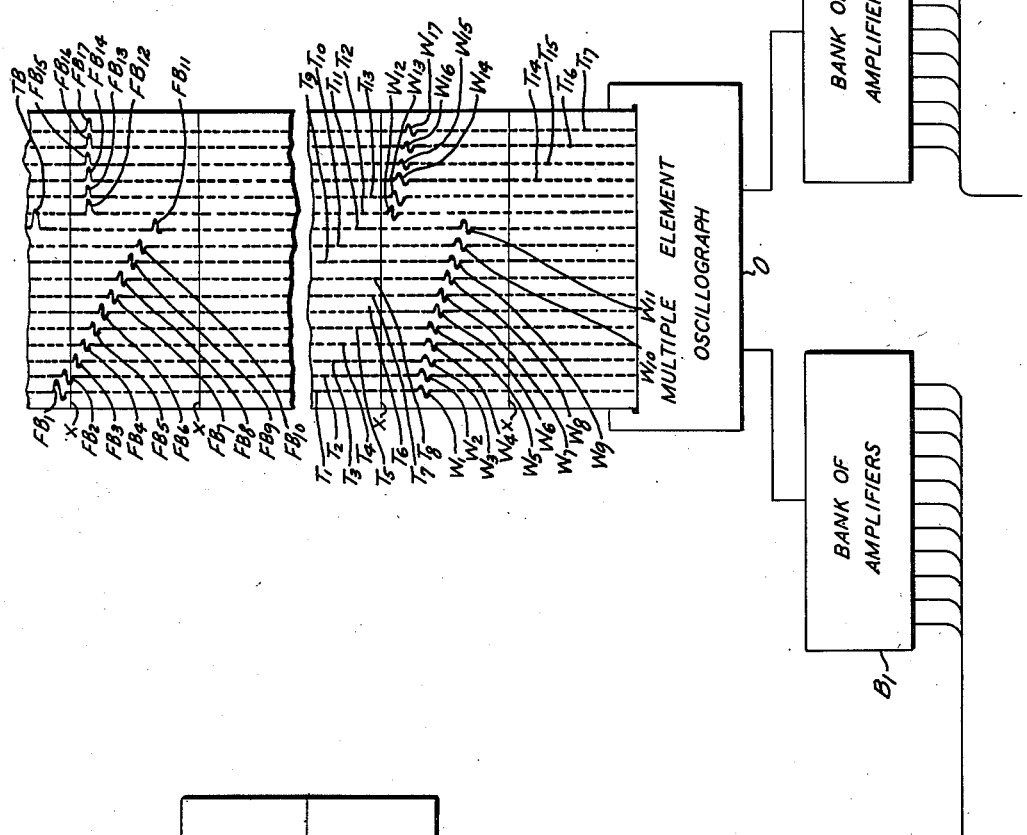

May 14, 1957 R. A. PETERSON 2,792,068
GEOPHYSICAL PROSPECTING SYSTEM
Filed May 6, 1953 5 Sheets-Sheet 3

RAYMOND A. PETERSON,
INVENTOR.

BY
Reed␣Lawlor
ATTORNEY.

May 14, 1957 R. A. PETERSON 2,792,068
GEOPHYSICAL PROSPECTING SYSTEM
Filed May 6, 1953 5 Sheets-Sheet 4
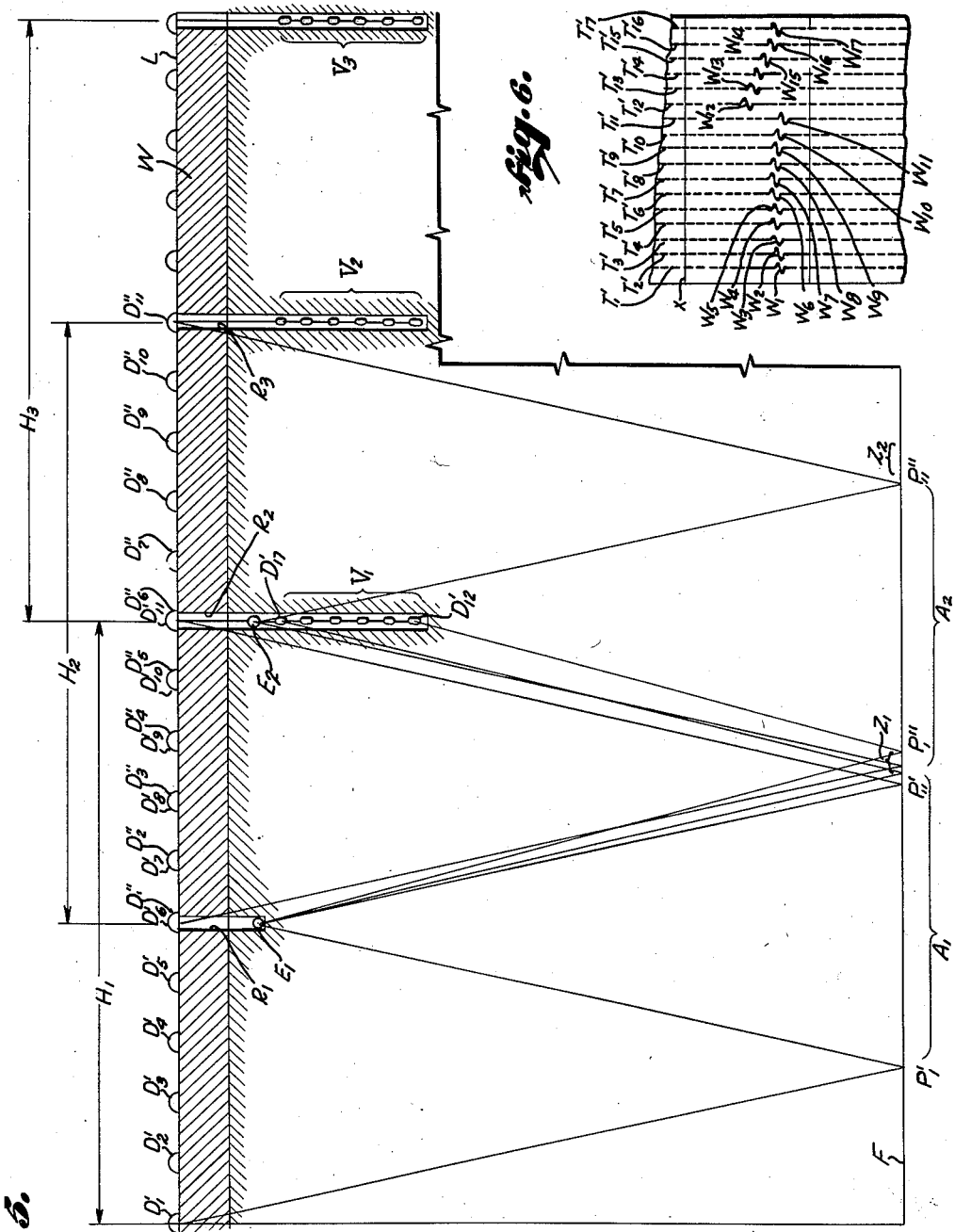
RAYMOND A. PETERSON,
INVENTOR.
BY
ATTORNEY.

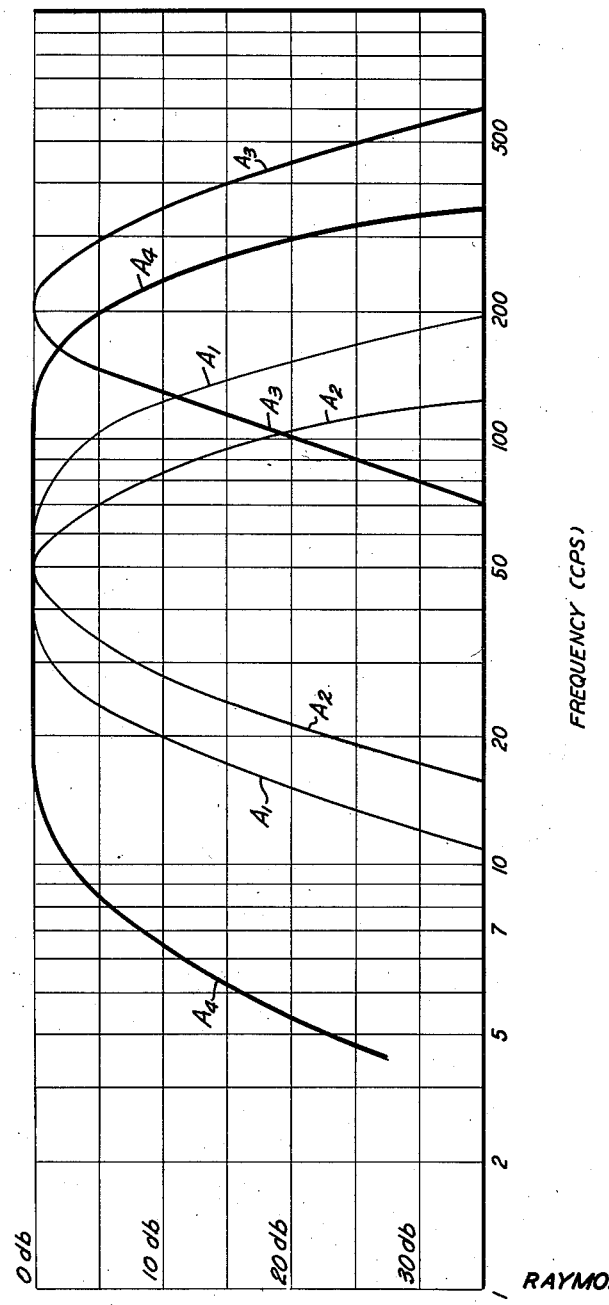

United States Patent Office 2,792,068
Patented May 14, 1957

2,792,068

GEOPHYSICAL PROSPECTING SYSTEM

Raymond A. Peterson, Altadena, Calif., assignor, by mesne assignments, to United Geophysical Corporation, Pasadena, Calif., a corporation of California Application May 6, 1953, Serial No. 353,326

13 Claims. (Cl. 181—.5)

This invention relates to geophysical prospecting systems, and more particularly to improvements in methods and apparatus employed in reflection seismic surveying. More particularly, this invention relates to improvements in the system of reflection seismic surveying that is disclosed and claimed in my copending patent application Serial No. 319,969, filed November 12, 1952.

In reflection seismic surveying, seismic waves that are generated at generating points, or, as they are more commonly called, shotpoints, adjacent the surface of the earth, travel downwardly and are partially reflected upwardly by reflecting surfaces between successive strata that the waves encounter in their downward travel. According to the invention of the aforementioned copending application, the reflected seismic waves are received at a plurality of mutually spaced seismic wave receiving stations that are arranged beneath the weathered layer in a substantially straight vertical line that is displaced horizontally from the shotpoint. This process is repeated for various combinations of generating points and receiving points along a line of exploration in order to obtain information regarding the structure of sub-surface formations.

According to my prior invention, in order to facilitate the recognition of waves reflected from widely separated reflection points on the same subterranean stratum, vertical spreads of receiving stations are established at a series of reception points along the line of exploration and a number of shotpoints are established between successive reception points. The waves generated at each shotpoint and reflected by the subterranean stratum are then received at each of the spreads of receiving stations at each adjacent reception point on opposite sides thereof. As explained in my prior application, this arrangement permits the receiving of waves from a large number of reflection points distributed along a reflecting stratum between the widely separated reflection points, thus resulting in "continuous" exploration of sub-surface strata. This use of a large number of shotpoints between successive reception points is of particular advantage when the character, that is shape, of waves reflected from a subterranean stratum varies widely over the area being explored. However, this method has the disadvantage that it requires the drilling of a large number of shotholes at the respective generating points in addition to deeper receiver holes at the reception points for supporting the vertical spreads of receivers.

As explained in my aforementioned prior application, the employment of vertical lines of receivers beneath the weathered layer facilitates more accurate measurement of the times required for seismic waves to travel from a generating point to various reflecting strata and thence to the receiving stations.

According to the present invention, the advantages of the method of continuous exploration of a sub-surface stratum of my aforementioned prior application are achieved more economically and more rapidly. Such increase in speed and economy is achieved with the present invention by employing fewer shotholes without sacrificing continuity of exploration. This result is accomplished by employing receivers spread along lines at or adjacent the surface of the earth as well as receivers spread along vertical lines. For convenience the term "horizontal spread" is used with reference to a plurality of receivers spread along a line at or adjacent to the surface, and the term "vertical spread" is used with reference to a plurality of receivers spread along a vertical line in the earth.

According to the present invention, the arrangement of horizontal spreads and shotpoints is such that the groups of waves received by the horizontal spreads facilitate the identification of waves that are reflected from widely spaced apart points of the same subterranean strata and are then received at vertical spreads. More particularly, in accordance with the present invention, sets of seismic waves are generated at a series of shotpoints. A first group of waves of each set of seismic waves is received at a horizontal spread of receivers and a second group of each set of seismic waves is received at a vertical spread of receivers, after reflection from a sub-surface stratum. The terms "first" and "second" are employed here not to indicate the order in which the groups of waves are received, but merely to distinguish one group from another. Furthermore, as will become more apparent hereinafter, the term "group of waves" is employed to indicate those portions or segments of a wave-front or wave-train which arrive at various receivers in a spread after reflection from a sub-surface stratum.

In some forms of the invention, different sets of the seismic waves are generated at different shotpoints. Also in some forms of the invention, groups of the seismic waves of some sets of seismic waves are received at the same horizontal and vertical spreads, while in others groups of waves of various sets of seismic waves are received at different horizontal and vertical spreads. However, in any event, waves in the second group of each set of seismic waves are received after reflection from points on the sub-surface stratum that are adjacent points thereon from which some of the waves of the first group of that set of waves are reflected. Also in any event, sets of waves are reflected from successive portions of the sub-surface stratum and reference waves are received in the various sets of seismic waves which assist in identifying waves of the different sets reflected from a common sub-surface stratum. Such reference, or tie, waves are reflected from adjacent, or nearby, points of successive portions of the sub-surface stratum and travel along paths along which the times of travel are substantially the same.

Various features, objects and advantages of my invention will become apparent from the following description taken in connection with the accompanying drawings in which:

Fig. 1 is a composite diagram of Figs. 1a and 1b which together represent one embodiment of the invention;

Fig. 1a is a schematic diagram of the amplifying and recording apparatus;

Fig. 1b represents a vertical cross-section of the earth to which the invention is applied;

Fig. 5 represents a vertical section of the earth employed in explaining a second embodiment of the invention;

Fig. 6 is a drawing of part of a seismogram produced by the method employed with the apparatus of Fig. 5; and Fig. 7 is a graph showing characteristics of band-pass filters which are employed in accordance with this invention.

Figure 3:
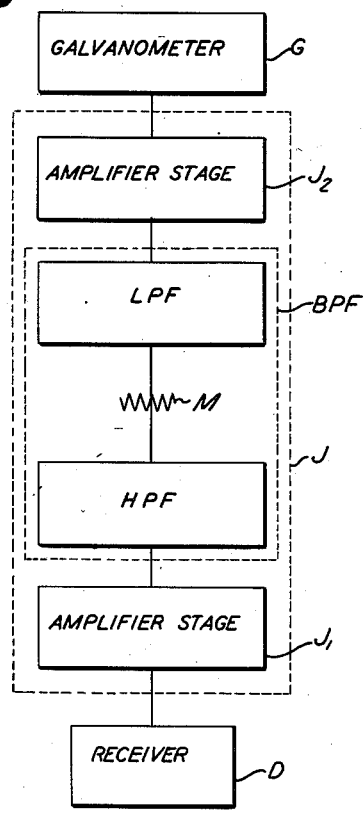
Fig. 3 is a single-line block diagram of a portion of the apparatus.

The invention may be practiced by following various methods. In this application, two methods only are described in detail. It will be understood, however, that other methods may be employed without departing from the principles of my invention.

*First method*

Referring to the drawings, and more particularly to Figs. 1a and 1b, there is illustrated schematically a vertical section of the earth to which my invention is applied, there being shown a weathered layer W and a single reflecting surface F between adjacent sub-surface strata. Though the invention is described below with reference to only a single such reflecting surface, an area of the earth undergoing investigation generally comprises a series of sub-surface formations which are arranged one above the other and successive sub-surface strata are similarly separated by other such reflecting surfaces. Actually, of course, the surface F is not generally a geometrical surface having no thickness but is generally a zone of transition in which characteristics of the material of the earth gradually change from one value to another. In any event, for simplicity, such a zone or surface is referred to herein as a reflecting surface or reflecting horizon and reflections therefrom are sometimes referred to as reflections from a sub-surface stratum, the reflection generally being ascribed to the stratum on the underside of the reflecting horizon.

In the embodiment of the invention shown in Figs. 1a and 1b, a series of seismic wave generating stations is located at shotpoints, or seismic wave generating stations, $S_1$, $S_2$, $S_3$ . . . and a series of receiving stations is located at reception points $R_1$, $R_2$ . . . The shotpoints and the reception points are alternately arranged along the line of exploration L—L in the area being surveyed, the reception point $R_1$ being located between the shotpoints $S_1$ and $S_2$, and the reception point $R_2$ being located between the shotpoints $S_2$, $S_3$, etc. In the simplest form of the embodiment of the invention illustrated in Fig. 1, the shotpoints $S_1$, $S_2$, $S_3$ . . . are uniformly spaced in the order named at known positions along the line of exploration; the reception points $R_1$, $R_2$, etc. are also uniformly spaced in the order named at known positions along the line of exploration; and the reception points are located midway between the shotpoints.

At each of the seismic wave generating stations $S_1$, $S_2$, $S_3$ . . . a shothole is drilled through the weathered layer into the earth. The shotholes are terminated at relatively shallow known depths beneath the weathered layer in one of the underlying formations. Sets of seismic waves may be generated in various ways at such a generating station. Ordinarily, a set of seismic waves is generated by detonating a charge of explosive that has been placed at the bottom of a shothole. In practice, such a charge is firmly held in place by means of a column of liquid, such as drilling mud, and the charge is detonated while so held in place. By so generating sets of seismic waves in underlying formations beneath the weathered layer, sharper explosions are produced than would ordinarily be produced if the explosive were detonated at or above the surface or in the weathered layer itself. By virtue of this fact, as is well known, a seismic wave is generated which is relatively rich in high-frequency components and which is of relatively uniform character from one shotpoint to another over a large area.

At each of the reception points $R_1$, $R_2$, . . . a receiver hole is drilled into the earth through the weathered layer and into the underlying formations, usually to a depth greater than the depths of the shotholes. Vertical spreads of receivers $V_1$, $V_2$, etc. are placed in the respective receiver holes and horizontal spreads of receivers $H_1$, $H_2$, etc. are laid out between successive pairs of shotpoints $S_1$, $S_2$, $S_3$, etc.

In one method of practicing the invention, with the embodiment thereof illustrated in Figs. 1a and 1b, sets of seismic waves are generated respectively at the shotpoints $S_1$, $S_2$ . . . and received at adjacent horizontal and vertical spreads of receivers. One group of a set of waves generated at shotpoint $S_1$ is received at the horizontal spread $H_1$ and another group of that set of waves is received at the vertical spread $V_1$. Similarly, one group of each of two sets of waves generated at the shotpoint $S_2$ is received at the horizontal spreads $H_1$ and $H_2$ respectively and another group of each of those two sets of waves is received at the vertical spreads $V_1$ and $V_2$ respectively. This process is repeated indefinitely along the line of exploration and is conducted in such a manner that waves received at vertical spreads after reflection from widely spaced apart portions of the reflecting horizon may be readily identified or correlated even though their character is not the same.

When a set of seismic waves is to be generated at shotpoint $S_1$, two spreads of seismic wave receivers are employed to receive the waves, namely, a horizontal spread $H_1$ of receivers, $D_1$, $D_2$ . . . $D_{10}$, and $D_{11}$ and a vertical spread $V_1$ of receivers $D_{12}$, $D_{13}$ . . . $D_{16}$, and $D_{17}$. The horizontal spread $H_1$ of receivers $D_1$ . . . $D_{11}$ is laid out between shotpoints $S_1$ and $S_2$. The end receivers $D_1$ and $D_{11}$ of the horizontal spread $H_1$ are located at or adjacent the shotpoints $S_1$ and $S_2$. The vertical spread $V_1$ of receivers $D_{12}$ . . . $D_{17}$ is arranged with the respective receivers at mutually spaced points along a vertical line in a receiver hole $R_1$. The receivers of the respective spreads are uniformly spaced apart. Thus, for example, if the distance between the successive shotholes $S_1$ and $S_2$ is 1000 feet, the distance between successive receivers $D_1$ . . . $D_{11}$ of the horizontal spread $H_1$ is 100 feet. The receivers $D_{12}$ . . . $D_{17}$ of the vertical spread are spaced about ten feet apart, and they are located about seventy-five feet or more beneath the bottom of the weathered layer.

The receivers of the horizontal spreads may be any suitable form of seismometer, such as a velocity responsive vibration detector of the type illustrated and described in patent No. 2,307,792 which issued to Herbert Hoover, Jr. on January 12, 1943. In the best mode of practicing my invention, the receivers of the vertical spreads, however, are in the form of hydrophones, and they are submersed in fluid in the receiver holes. Such a hydrophone is illustrated, for example, in copending patent application Serial No. 366,093 filed July 6, 1953.

As shown in Figs. 1a and 1b, each of the receivers $D_1$ . . . $D_{11}$ of the horizontal spread $H_1$ is connected to a separate amplifier of a first bank of amplifiers $B_1$, and each of the detectors $D_{12}$ . . . $D_{17}$ of the vertical spread $V_1$ is connected to a separate amplifier of a second bank of amplifiers $B_2$. The various amplifiers of the two banks of amplifiers $B_1$ and $B_2$ are connected to separate galvanometer elements of the multiple-element oscillograph O.

Figure 4:
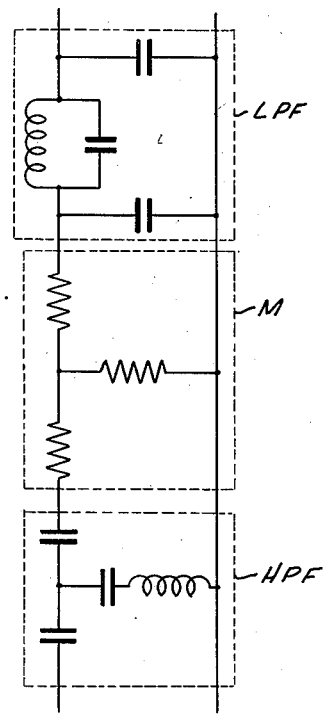
Fig. 4 is a wiring diagram of a band-pass filter embodied in the apparatus of Fig. 3.

A typical arrangement of receiver, amplifier and galvanometer is illustrated in Fig. 3. In such an arrangement, the output of a typical receiver D is supplied to the input of a recording channel comprising an amplifier J and a galvanometer element G that forms one of the elements of the multiple-element oscillograph O of Fig. 1a. The amplifier J comprises an amplifier stage $J_1$, a band-pass filter BPF, and a second amplifier stage $J_2$, all arranged between the input and the output of the amplifier J in the order mentioned. The band-pass filter, BPF, itself consists of two sections, a high-pass filter HPF, and a low-pass filter LPF, interconnected by means of an impedance matching network M. A typical arrangement of impedance matching network M, high-pass filter HPF, and low-pass filter LPF, of the types that may be employed is shown in Fig. 4. While each of the filters is shown with only one section, it will be understood that more sections may be employed.

In practice, seismic waves received by a receiver D generate corresponding electrical oscillations which pass through the amplifier stage $J_1$, the high-pass filter HPF, the impedance matching device M, the low-pass filter LPF, and the amplifier stage $F_2$, and are then impressed upon the galvanometer element G. If desired, electrical waves appearing at the outputs of various receivers D may be mixed in various ways before being impressed upon the various elements of the multiple element oscillograph. However, since such methods of mixing signals are well known in the art, my invention is described here without specific reference thereto.

When the set of seismic waves is generated at the shotpoint $S_1$ by detonation of a charge $E_1$ of explosive, they travel downwardly to the reflecting surface F and are reflected upwardly to the receivers $D_1 \ldots D_{17}$. Waves of one group are reflected at points $P'_1, P'_2 \ldots P'_{11}$ respectively of one portion $A_1$ of the reflecting horizon F, and after reflection they are received by the respective detectors $D_1 \ldots D_{11}$ of the horizontal spread $H_1$. Waves received from successive, or nearby, reflection points $P'_1 \ldots P'_{11}$ will be of very nearly the same character, or shape, even though waves reflected from widely spaced apart points of the reflecting portion $A_1$ may differ considerably.

Figure 2:
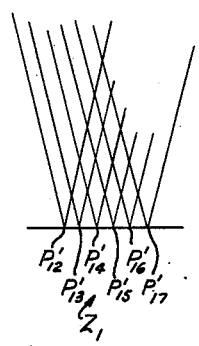
Fig. 2 is an enlarged drawing of a portion of Fig. 1b.

Waves of another group of this same set of waves are reflected at points $P_{12}' \ldots P_{17}'$ at part $Z_1$ of the reflecting horizon F as shown in Fig. 2 and after reflection they are received by the receivers $D_{12}' \ldots D_{17}'$ of the vertical spread $V_1$. It will be noted that this second group of waves is reflected from a part $Z_1$ of the reflecting horizon F that is about midway between the ends of the portion $A_1$ from which the first group of waves is reflected, this part $Z_1$ being adjacent the points $P_6'$ and $P_7'$ of reflection of the seismic waves which are received at the receivers $D_6$ and $D_7$ of the horizontal spread $H_1$. For this reason, the waves reflected to the vertical spread will have very nearly the same character as the waves reflected to receivers $D_6$ and $D_7$ and other nearby receivers at the center of the horizontal spread, even though waves reflected from widely spaced apart points of the reflecting portion $A_1$ may differ considerably.

In Fig. 1a there is illustrated a part of a seismogram of the type produced in recording a single set of seismic waves that has been generated and received as described above. It will be noted that on this seismogram, eleven horizontal spread traces $T_1$ to $T_{11}$ represent records of waves received at the detectors $D_1 \ldots D_{11}$ respectively of the horizontal spread, and that vertical spread traces $T_{12} \ldots T_{17}$ represent records of waves received at the receivers $D_{12} \ldots D_{17}$ of the vertical spread $V_1$. The seismogram has marked thereon a series of timing lines X which are formed by methods well known in the art and which are employed to determine the time required for waves to travel over various paths from the shotpoint to the respective receivers. On this record increased distance in a downward direction represents increase in travel time, the exact travel time being determined from the spacing between timing lines X.

More particularly, the waves which are first received at the receivers $D_1 \ldots D_{11}$ are designated by the symbols $FB_1 \ldots FB_{11}$ respectively; likewise, the waves first received by the receivers $D_{12} \ldots D_{17}$ of the vertical spread are designated by the symbols $FB_{12} \ldots FB_{17}$ respectively. Such first received waves are known as "first breaks." The first group of seismic waves, which have been reflected from the reflecting surface F and have been received at the receivers $D_1 \ldots D_{11}$, are designated by the symbols $W_1 \ldots W_{11}$ respectively. The seismic waves of the second group of this set of waves, which have been received at the receivers $D_{12} \ldots D_{17}$ are designated by the symbols $W_{12} \ldots W_{17}$ respectively. It will be noted that in the record illustrated the second group of the reflected waves $W_{12} \ldots W_{17}$ arrive somewhat earlier than any of the corresponding reflected waves $W_1 \ldots W_{11}$ of the first group. Whether or not this relationship prevails depends on the depth and strike and dip of the parts of the horizon at which the reflections occur. However, it is common for this relationship to exist when the dip is low provided the depth of the reflecting horizon is large compared to the length of the horizontal spread.

A time break TB is also recorded on one of the traces in order to indicate the time of detonation of the explosive charge. The electrical system by means of which the charge is detonated and the record is made of the instant of detonation, is well known to those skilled in the art and is not described here.

To aid in recognizing records of waves in the two groups, the uphole time is measured, that is the time required for a wave to travel from any particular point in the receiver hole $R_1$ to a point at the surface. One way to do this is to detonate a small charge at the top of the hole $R_1$ and measure the times required for the wave to travel to the respective receivers in the vertical spread $V_1$ therein. To make such measurement, a record is made with the apparatus of Fig. 1a, the record showing the instant of detonation and also oscillographic representations of the waves arriving at the receivers $D_{17} \ldots D_{12}$ in turn. From this record, the time of travel from the location of the small charge to any receiver is easily determined.

Without moving the receivers, a second set of seismic waves is then generated at the shotpoint $S_2$ by detonation of a second charge $E_2$ of explosive and a similar record of these waves is made. One group of this set of seismic waves is received at the horizontal spread $H_1$ of receivers after reflection from points $P_1'' \ldots P_{11}''$ of a second portion $A_2$ of the reflecting horizon F, and a second group of this set of seismic waves is received at the vertical spread $V_1$ of receivers after reflection from a part $Z_2$ of the reflecting horizon F. It will be noted here, as before, that this part $Z_2$ of the reflecting horizon is adjacent the points $P_5''$ and $P_6''$ from which waves are reflected to the receivers $D_5$ and $D_6$ and that therefore the waves reflected to the vertical spread will have a character similar to the waves reflected to the receivers $D_5$ and $D_6$ and other receivers nearby as in the prior instance.

After the sets of waves have been generated at shotpoints $S_1$ and $S_2$ and recorded at the spreads $H_1$ and $V_1$, the receivers $D_1 \ldots D_{11}$ are then moved to a second horizontal spread $H_2$ extending from shotpoint $S_2$ to shotpoint $S_3$, and the receivers $D_{12} \ldots D_{17}$ are moved to a second vertical spread $V_2$ in the receiver hole $R_2$. With the receivers laid out in the horizontal spread $H_2$ and the vertical spread $V_2$, as before, the process previously described above is repeated, a third set of seismic waves being generated at the shotpoint $S_2$ by detonation of a charge $E_3$ of explosive and a fourth set of seismic waves being generated at the shotpoint $S_3$ by detonation of a charge $E_4$ of explosive. A first group of the third set of seismic waves is received at the horizontal spread of receivers $H_2$ after reflection from points $P_1''' \ldots P_{11}'''$ in a third portion $A_3$ of the reflection horizon F, and a second group of that set of waves is received at the vertical spread of receivers $V_2$ after reflection from points in a part $Z_3$ of the reflecting horizon F about midway between the ends of the third portion $A_3$. Likewise, a first group of the fourth set of seismic waves is received at the horizontal spread of receivers $H_2$ after reflection from points $P_1^{IV} \ldots P_{11}^{IV}$ in a fourth portion $A_4$ of the reflecting horizon F, and a second portion of that set of waves is received at the vertical spread of receivers $V_2$ after reflection from points in a part $Z_4$ of the reflecting horizon F midway between the ends of the fourth portion $A_4$. Uphole times are also determined at the second vertical spread $V_2$ by the method described above.

It will be noted that the successive sets of reflected waves include pairs of reference waves that are reflected from points at adjacent or substantially contiguous parts of successive portions of the reflecting horizon F and that the reference waves of each pair travel over paths of substantially the same length and that the times of travel of the waves over these paths are substantially the same. Under these circumstances, the two reference waves of each pair have very nearly the same character and it is a relatively easy matter to identify such waves on records made of sets of seismic waves reflected from successive portions of the reflecting horizon. Furthermore, waves which are reflected from successive points of a portion of the reflecting horizon F to the horizontal spread are relatively easily recognized on the various traces of the record produced, even though the character of the waves may change from one end of the record to another. Likewise, the waves which are reflected from the parts $Z_1$, $Z_2$, $Z_3$, and $Z_4$, even if not easily correlated with each other, nevertheless are relatively easily correlated with waves of the first groups of the respective sets of seismic waves which are detected by the receivers of the horizontal spread which receive waves from the corresponding respective portions of the reflecting horizon F.

Thus, for example, groups of waves generated at shotpoints $S_1$ and $S_2$ and reflected from parts $Z_1$ and $Z_2$ of the reflecting horizon F to the common vertical spread $V_1$ are more easily correlated by virtue of the reception at the horizontal spread $H_1$ of groups of waves from these same shotpoints after reflection from portions $A_1$ and $A_2$ of the reflecting horizon F. This correlation is aided by the fact that the respective seismograms include reference waves of different sets reflected from adjacent points $P_{11}'$ and $P_1''$ of successive portions $A_1$ and $A_2$ of the reflecting horizon. Likewise, for example, groups of waves generated at the shotpoint $S_2$ and reflected from parts $Z_2$ and $Z_3$ of the horizon F to the vertical spreads $V_1$ and $V_2$ are more easily correlated by virtue of the reception at the horizontal spreads $H_1$ and $H_2$ of groups of waves from this shotpoint after reflection from the portions $A_2$ and $A_3$ of the reflecting horizon F. This correlation is aided by the fact that the respective seismograms of the sets of waves recorded at the horizontal spreads $H_1$ and $H_2$ include reference waves of the different sets reflected from adjacent points $P_{11}''$ and $P_1'''$ of the adjacent portions $A_2$ and $A_3$ of the reflecting horizon. Similarly, the waves reflected from the parts $Z_3$ and $Z_4$ of the reflecting horizon are more easily correlated with each other and with the waves reflected from the parts $Z_1$ and $Z_2$ by the reception of groups of waves at the horizontal spread $H_2$. As a further aid in correlating waves reflected from successive portions of reflecting horizons, the charges are detonated at about the same depth beneath the bottom of the weathered layer.

It is thus apparent that by recording groups of waves at a horizontal spread between two shotpoints, as explained above, I have provided a method for more easily correlating groups of waves from those shotpoints which are detected by a common vertical spread of receivers between the shotpoints. Also it is apparent that my method facilitates correlation of reflected waves received at two different vertical spreads of receivers, when the two sets of waves are generated at a common shotpoint and received at two separate horizontal spreads of receivers extending from the shotpoint past the reception points.

It will be obvious that the method described above may be varied in many ways without departing from the fundamental principles involved. For example, a charge may be exploded at the bottom of shothole $S_1$ and recorded at a setup comprising the horizontal spread $H_1$ and the vertical spread $V_1$. Then a split spread of receivers may be laid out between the shothole $S_1$ and the shothole $S_3$ comprising, in effect, both of the spreads $H_1$ and $H_2$. With vertical spread $V_1$ retained in place, an additional vertical spread $V_2$ is located in receiver hole $R_2$. With such a setup of receivers, a charge of explosive is detonated at the bottom of shothole $S_2$ and recorded by means of a multiple-element oscillograph connected to the receiver in all of the receivers in the split horizontal spreads $H_1$ and $H_2$ and the vertical spreads $V_1$ and $V_2$. Thereafter, the receivers in the horizontal spread $H_1$ and those in the vertical spread $V_1$ are moved to the next position along the line of exploration, now forming a second split horizontal spread centered at shothole $S_3$ and a pair of vertical spreads located on the opposite sides of shothole $S_3$. With a setup comprising the second split horizontal spread and the second pair of vertical spreads and shothole $S_3$, a charge is then exploded at the bottom of shothole S and the waves received at the various receivers are recorded. In this form of the method, reference waves are also employed to correlate groups of waves from different shotpoints that are detected by vertical spreads of receivers therebetween.

*Second method*

An alternative embodiment of my invention is illustrated in Fig. 5. In this case, a series of points $R_1$, $R_2$, $R_3$ are arranged along the line of exploration L—L. These points are employed both as reception points and as shotpoints. In one method of employing this embodiment of my invention, split horizontal spreads $H_1$, $H_2$, $H_3$ . . . of receivers are laid out along the line of exploration. Each spread extends in each direction from the corresponding shotpoint $R_1$, $R_2$, $R_3$ . . . by a distance about equal to the spacing between successive shotpoints. Corresponding vertical spreads $V_1$, $V_2$, $V_3$ of receivers are employed in receiver holes at one end of each horizontal spread. As the shooting and recording progresses along the line of exploration, the horizontal spread and the vertical spread are advanced together, a vertical spread always being positioned at the next shotpoint in the line which has not yet been used for shooting. In practice, all of the holes, except possibly the first one to be employed in the series, are drilled to a substantial depth beneath the bottom of the weathered layer in order that the vertical spread of receivers may be located at suitable depths. Each set of seismic waves may be generated by detonating a charge of explosive at the bottom of each hole, or at any suitable depth therein beneath the weathered layer.

More particularly, in conducting a reflection seismic survey with the embodiment of the invention illustrated in Fig. 5, a horizontal spread $H_1$ of receivers $D_1'$ . . . $D_{11}'$ is placed along the line of exploration L—L. The receivers are uniformly spaced apart. Thus, for example, if there are eleven receivers $D_1'$ . . . $D_{11}'$ and the holes are 500 feet apart, the receivers are 100 feet apart. The middle receiver $D_6'$ is at or adjacent the top of the hole $R_1$ and the receivers $D_1'$ . . . $D_5'$ are on one side thereof, and the receivers $D_7'$ . . . $D_{11}'$ are on the opposite side thereof, the entire arrangement constituting a split spread. The corresponding vertical spread $V_1$ is located in the hole $R_2$ at one end of the horizontal spread $H_1$.

A first set of waves is generated by detonating a first charge E of explosive at shothole $R_1$. A first group of the first set of seismic waves travels downwardly to the reflecting horizon F and is reflected upwardly from a series of points $P_1'$ . . . $P_{11}'$ in a first portion $A_1$ thereof to the receivers $D_1'$ . . . $D_{11}'$ respectively. A second group of this set of seismic waves travels downwardly to the reflecting horizon F and is reflected upwardly from the part $Z_1$ adjacent the reflection point $P_{11}'$ at one end of the first reflecting portion $A_1$. These waves are detected at receivers $D_{12}'$ . . . $D_{17}'$ of the vertical spread $V_1$. The waves received at the two spreads are recorded in the manner described hereinabove.

In Fig. 6 there is illustrated a portion of a record obtained. The reflected waves that are received by the detectors $D_1' \ldots D_{11}'$ are represented on the record by the waves $W_1 \ldots W_{11}$ of the horizontal-spread traces $T_1' \ldots T_{11}'$ and the waves received by the receivers $D_{12} \ldots D_{17}$ are represented by the waves $W_{12} \ldots W_{17}$ of the vertical-spread traces $T_{12}' \ldots T_{17}'$. Here it will be noted that, because of the depth of the vertical spread, the reflected waves are received there earlier than they are received at the receivers $D_1 \ldots D_{11}$ at the horizontal spread. Actually, there may be some overlapping of the time of arrival of waves at the vertical spread and at the horizontal spread, depending upon the spacing of the spreads and the depth of the reflecting surface. However, for reflections from horizons at a depth great compared with the length of the horizontal spread, the timing arrangement indicated in Fig. 6 would be typical.

The vertical spread of receivers is then removed from the hole $R_2$ and placed in hole $R_3$, forming a new vertical spread $V_2$. Concurrently, some or all of the detectors $D_1' \ldots D_{11}'$ are moved and laid out between the holes $R_2$ and $R_3$ to form the second horizontal spread $H_2$. For convenience in identification, the receivers of the second spread are here designated as $D_1'' \ldots D_{11}''$, even though some of the receivers may not have been moved. In any event, again the receivers are uniformly spaced along the line between the holes $R_1$ and $R_3$.

A second charge $E_2$ of explosive is lowered to the bottom of the shothole $R_2$ and is detonated to generate a second set of seismic waves. One group of this set of seismic waves is received by the receivers $D_1'' \ldots D_{11}''$ of the second horizontal spread $H_2$ after reflection from points $P_1'' \ldots P_{11}''$ in a second portion $A_2$ of the reflected horizon F. Another group of this set of seismic waves is received at the receivers $D_{12}'' \ldots D_{17}''$ in the vertical spread $V_2$ after reflection from another part $Z_2$ of the reflecting horizon F adjacent the reflecting point $P_{11}''$. The process is continued by repeatedly advancing the receivers from one vertical spread to the next and from one corresponding horizontal spread to the next along the line of exploration and at the same time advancing the position at which a charge of explosive is detonated to generate a set of seismic waves.

It will be noted that in each recording, waves that are received in the vertical spread are reflected from points on the reflecting horizon that are adjacent points from which some of the first group of the same set of seismic waves are reflected. It will also be noted that among the waves of the first groups of successive sets of seismic waves received at horizontal spreads, there are pairs of reference waves that are reflected from adjacent points of successive portions of the reflecting horizon and that the reference waves in each pair require substantially the same time to travel from their respective shotpoints to the receivers at which they are received and that they travel over paths of substantially the same length. Thus, for example, in the first recording, a reference wave travels from the position of the charge $E_1$ to the reflection point $P_{11}'$ and thence to the receiver $D_{11}'$, adjacent the top of the shothole $R_2$. Also, in the second recording a reference wave travels from the position of the charge $E_2$ to the reflecting point $P_1''$ and thence to the receiver $D_1''$ that is located adjacent the top of the hole $R_1$. The path $E_1 P_{11}' D_{11}'$ and the path $E_2 P_1'' D_1''$ have about the same length and the time required for waves to travel therealong is substantially the same. Furthermore, it will be noted that the waves recorded at the vertical spread $V_1$ are reflected from points on the reflecting horizon F that are adjacent the reflecting points $P_{11}'$ and $P_1''$.

As in the first method of practicing the invention described above, the substantial equality of lengths of path of reference waves of each pair and the substantial equality of their travel times and the fact that they are reflected from adjacent points of successive portions of the reflecting horizon, facilitate recognition of waves on separate records which have been reflected from the same horizon. Furthermore, as in the prior instance, the fact that the waves recorded in each vertical spread $V_1$ and the corresponding horizontal spread $H_1$ represent two groups of a set of waves generated at one shothole also facilitates recognizing waves which are reflected from the same reflection horizon. This identification of the waves is facilitated even though the times of travel of the waves to the receivers of each vertical spread may differ somewhat from those received in the corresponding horizontal spread. Ordinarily, as work progresses along a line of exploration, the time required for a wave to travel from any particular depth in a hole to a receiver at the top of the hole is determined in the course of making recordings at the horizontal spread. This time of travel is very nearly equal to the difference in the time of travel of waves to at least one of the receivers $D_{12} \ldots D_{17}$ of the vertical spread and the receiver of the horizontal spread that is directly thereabove.

More particularly when the second set of waves is generated by shooting at the bottom of the second shothole $R_2$, the time interval, known as the "up-hole time," required for waves to travel to a receiver $D_6''$ at the top of the hole is determined. This time interval is about equal to the difference between the time of travel of a wave over the path $E_1 P_{11}' D_{11}'$ and the time of travel of a wave from the shotpoint $R_1$ to the part $Z_1$ on the reflecting horizon F to one of the receivers $D_{12} \ldots D_{17}$ in the receiver hole $R_2$.

In practice, the record produced by shooting at shothole $R_1$ and the record produced by shooting at the shothole $R_2$, are placed side by side with the traces of reference waves opposite each other. These reference waves are relatively easy to correlate as explained above. Then the waves received at the vertical spread $V_1$ are located on the first record by examining the portion of the vertical spread traces which lies in advance of the horizontal spread waves by a distance on the record corresponding to the up-hole time as determined from the second record or independently by the method previously described above. This process is repeated for records from successive portions of the reflecting horizon and in this way waves from that horizon that have been recorded at the successive vertical spreads are identified. This method is particularly advantageous to employ when, for some reason, there is a wide difference in the character of the vertical spread traces and the horizontal spread traces.

Frequently, both in the present method II and in method I previously described, it is desirable to detonate a series of explosives at different depths of a shothole in order to obtain a suitable or satisfactory record. Preferably, however, at least one charge is detonated at about the same depth in each pair of setups corresponding to successive portions of the reflecting horizon. By a "setup" is meant a particular combination of shotpoint, vertical spread, and horizontal spread. It will be noted that by following the procedures described above, a series of such shots may be made at successively reduced depths in each shothole without redrilling of the hole for each shot and that in method II, this result may be accomplished without interfering with the placement of the vertical spread of receivers in the shotholes.

Filter characteristics

In the practice of my method the waves received are usually selectively amplified before recording. The selective amplification is obtained with the aid of the band-pass filter BPF in each of the amplifiers J. In practicing the invention, the waves received by the receivers of the vertical spreads are selectively amplified over a range of frequencies that includes frequencies that are at least as high as those that are selectively amplified from the horizontal spread.

In Fig. 7 there are represented typical overall frequency response characteristics of recording systems that have been found suitable for use with my invention. In this figure, abscissae represent frequency in cycles per second (C. P. S.) while ordinates represent relative values of amplification in decibles (db). The selective amplification characteristics shown here take into account the response characteristic of the receiver, the filtering characteristics of the band-pass filters BPF, and also the response characteristic of the recording galvanometers and other elements in the system. The peak of each of the curves shown is arbitrarily set at 0 decibels.

Curves $A_1$ and $A_2$ are representative of band-pass characteristics suitable for reproducing waves received at the horizontal spreads. Here it will be noted that with the characteristic $A_1$ low frequency waves below about 20 C. P. S. and high frequency waves above about 120 C. P. S. are attenuated relatively highly, while with the characteristic $A_2$ low frequency waves below about 27 C. P. S. and high frequency waves above about 80 C. P. S. are attenuated relatively highly but that in each case waves in an intermediate band of frequencies are amplified relatively highly. With such an arrangement, disturbances due to low frequency ground roll and wind noise and other noises present at the surface, are reduced or minimized, thus facilitating obtaining good records of reflected waves received at horizontal spreads. It will be noted that the characteristic $A_2$ is narrower or sharper than the characteristic represented by curve $A_1$. A relatively narrow characteristic curve, such as $A_2$, is generally found to be more practical to employ than a relatively broad curve, such as $A_1$, though the latter is preferred in cases where high fidelity recording is desired.

Graphs $A_3$ and $A_4$ represent the overall amplification characteristics of systems suitable for reproducing waves received at vertical spreads. It will be noted that these curves too have band-pass characteristics. Curve $A_3$ represents the characteristic of a system that amplifies high frequency components between about 120 C. P. S. and 230 C. P. S. but attenuates components in the range of frequencies below about 120 C. P. S. Curve $A_4$ represents the characteristic of a system that amplifies components of waves in a wide range of frequencies including medium and low frequencies above about 6 C. P. S. as well as high frequencies below about 120 C. P. S. Both curves $A_3$ and $A_4$ have higher cutoff frequencies at the high end than either curve $A_1$ or curve $A_2$. However, in both cases the systems for recording waves received at the vertical spread amplify waves of a higher frequency than those selectively amplified in the system for recording waves received by the horizontal spread. When employing a system having the characteristic represented by the curve $A_3$, some difficulty may be experienced in recognizing waves received by the horizontal and vertical spreads. This difficulty is not so great when a system having the characteristic represented by the curve $A_4$ is employed, because in this case components of the waves in the middle range of frequencies are highly amplified in recordings of both groups of waves. However, knowledge of uphole times aids in locating records of vertical-spread waves on the seismograms. In any event, by virtue of the fact that high frequency components of waves received in the vertical spread are selectively amplified and recorded, it becomes possible to measure the time of travel of seismic waves to the receivers in the vertical spread more accurately than would otherwise be the case, all as explained in the patent application aforementioned.

As a further aid in recognizing waves that are reflected from a particular reflecting horizon and are received by a horizontal spread concurrently with those which are received at a vertical spread, waves received at nearby receivers of the respective spreads are applied to recording channels having the same frequency response characteristics. Thus, for example, if a recording system having the band-pass characteristic $A_2$ is being employed with a horizontal spread $H_1$ and a recording system having the band-pass characteristic $A_3$ is being employed with the corresponding vertical spread $V_1$ of Fig. 1, then an extra recording channel having the band-pass characteristic $A_2$ may be connected to the receiver $D_{17}$ at the top of the vertical spread $V_1$. In the alternative, an extra recording channel having the band-pass characteristic $A_3$ may be connected to the receiver $D_6$ directly above the vertical spread $V_1$. In either event, the employment of such an extra recording channel produces an auxiliary trace on the seismogram and this trace aids in the recognition of waves in the two groups of waves that have been reflected from a common horizon. Similar arrangements may be employed in the system of Fig. 5.

While my invention has been described with particular reference to specific embodiments thereof and particular methods for practicing my invention with such embodiments, it will be understood by those skilled in the art that many embodiments and methods may be employed other than those specifically disclosed herein. Various changes which will now suggest themselves to those skilled in the art may be made in the form, details of construction and arrangement of the elements and in the steps employed in my process without departing from the principles of the invention.

More particularly it will be understood that the sets of waves may be generated in other ways and at nonuniform depths and that receivers, amplifiers, filters and recorders of other kinds and having other characteristics may be employed in receiving and reproducing the waves. Also, of course, the waves may be generated and recorded in different sequences than those described. Furthermore, the spreads need not be on the line of exploration, but may be offset short distances therefrom. Also, the spreads at which waves are received need not be adjacent the shotpoints at which they are generated but may be spaced therefrom some distance along the line of exploration. However, it is important that horizontal spreads as well as vertical spreads be employed and that reference waves be received in different sets of waves, reflected from adjacent portions of reflecting strata. In every case the reference waves are reflected from reflection points which are adjacent each other, that is, they are either substantially identical or are spaced apart distances that are small compared with the lengths of the portions of the reflecting horizons from which the corresponding sets of waves are reflected. It will also be understood that the vertical spreads may be extended to the surface instead of lying entirely beneath the weathered layer to aid in correlating the two groups of waves received at the horizontal spreads and at the receivers of the vertical spreads that lie beneath the weathered layer. In any event, the times of travel of waves from the respective shotpoints to particular reflecting horizons and thence to such receivers, are measured, and these measurements are employed in determining the strike and dip and the depth of the various horizons. Various methods of computation that may be employed will readily occur to those skilled in the art and are, therefore, not described here.

It is, therefore, to be understood that my invention is not limited to the specific forms thereof disclosed herein but includes all forms thereof that are within this scope of the appended claims.

I claim:

1. In reflection seismic surveying, the process which comprises the steps of: generating sets of seismic waves at a series of shotpoints along a line of exploration; receiving a first group of each set of seismic waves at a horizontal spread of reception points at or adjacent the surface of the earth and a second group of each set of seismic waves at a vertical spread of reception points in the earth after said groups of waves have been reflected from a series of relatively closely spaced points of a portion of a subsurface stratum, the various sets of seismic waves being received from successive portions of said sub-surface stratum; and receiving in the first groups of said sets of waves pairs of reference waves which have been reflected from adjacent points of successive portions of the sub-surface stratum after travel along paths along which the times of travel are substantially the same.

2. In reflection seismic surveying, the process which comprises the steps of: generating sets of seismic waves at a series of shotpoints along the line of exploration; receiving a first group of each set of seismic waves at a horizontal spread of reception points at or adjacent the surface of the earth and a second group of each set of seismic waves at a vertical spread of reception points in the earth after said groups of waves have been reflected from a series of relatively closely spaced points of a portion of a sub-surface stratum, the various sets of seismic waves being received from successive portions of said sub-surface stratum; receiving in the first groups of said sets of waves pairs of reference waves which have been reflected from adjacent points of successive portions of the sub-surface stratum after travel along paths along which the times of travel are substantially the same; selectively amplifying waves of said first groups over a band of frequencies including a range of middle frequencies and excluding a range of high frequencies; and selectively amplifying waves of said second groups over a band of frequencies including said range of high frequencies and recording the amplified waves as a multiple trace record.

3. In reflection seismic surveying, the process which comprises the steps of: generating sets of seismic waves at a series of shotpoints along a line of exploration; receiving a first group of each set of seismic waves at a horizontal spread of reception points at or adjacent the surface of the earth after reflection from a series of reflection points on a portion of the sub-surface stratum, receiving a second group of each set of seismic waves at a vertical spread of reception points in the earth after reflection from a part of the sub-surface stratum that is adjacent one of said reflection points, the various sets of seismic waves being received from successive portions of said subsurface stratum; and receiving in the first groups of said sets of waves pairs of reference waves which have been reflected from adjacent points of successive portions of the sub-surface stratum after travel along paths along which the times of travel are substantially the same.

4. In reflection seismic surveying, the process which comprises the steps of: generating a first set of seismic waves in the earth; receiving a first group of said first set of seismic waves at a series of horizontally spaced reception points and a second group of said first set of seismic waves at a series of vertically spaced reception points, said first set of seismic waves being received after reflection from one portion of a subsurface stratum, the waves in the second group of said first set of seismic waves being reflected from points on the sub-surface stratum that are adjacent points thereon from which some of the first group of said first set of seismic waves are reflected; generating a second set of seismic waves in the earth; receiving a first group of said second set of seismic waves at a series of horizontally spaced reception points and a second group of said second set of seismic waves at a series of vertically spaced reception points, said second set of seismic waves being received after reflection from a second portion of a sub-surface stratum, the waves in the second group of said second set of seismic waves being reflected from points on the sub-surface stratum that are adjacent points thereon from which some of the first group of said second set of seismic waves are reflected; and receiving in said first groups of waves two reference waves reflected from adjacent points in the two corresponding portions of the sub-surface stratum, the time of travel of the two reference waves being substantially the same.

5. In reflection seismic surveying, the process which comprises the steps of: generating a first set of seismic waves in the earth; receiving a first group of said first set of seismic waves at a series of horizontally spaced reception points and a second group of said first set of seismic waves at a series of vertically spaced reception points, said first set of seismic waves being received after reflection from one portion of a subsurface stratum, the waves in the second group of said first set of seismic waves being reflected from points on the sub-surface stratum that are adjacent points thereon from which some of the first group of said first set of seismic waves are reflected; generating a second set of seismic waves in the earth; receiving a first group of said second set of seismic waves at a series of horizontally spaced reception points and a second group of said second set of seismic waves at a series of vertically spaced reception points, said second set of seismic waves being received after reflection from a second portion of a sub-surface stratum, the waves in the second group of said second set of seismic waves being reflected from points on the sub-surface stratum that are adjacent points thereon from which some of the first group of said second set of seismic waves are reflected; receiving in said first groups of waves two reference waves reflected from adjacent points in the two corresponding portions of the sub-surface stratum, the time of travel of the two reference waves being substantially the same; selectively amplifying the waves received in the first groups of both sets of waves over a first selected range of frequencies, and selectively amplifying the waves received in the second groups of both sets of waves over a second selected range of frequencies that includes frequencies higher than those in said first selected range.

6. In reflection seismic surveying, the process which comprises the steps of: generating at a first shotpoint a first set of seismic waves; receiving a first group of said first set of seismic waves at a series of horizontally spaced reception points and a second group of said first set of seismic waves at a series of vertically spaced reception points, said first set of seismic waves being received after reflection from one portion of a sub-surface stratum, the waves in the second group of said first set of seismic waves being reflected from points on the sub-surface stratum that are adjacent points thereon from which some of the first group of said first set of seismic waves are reflected; generating at a second shotpoint a second set of seismic waves; receiving a first group of said second set of seismic waves at said series of horizontally spaced reception points and a second group of said second set of seismic waves at said series of vertically spaced reception points, said second set of seismic waves being received after reflection from a second portion of a sub-surface stratum, the waves in the second group of said second set of seismic waves being reflected from points on the sub-surface stratum that are adjacent points thereon from which some of the first group of said second set of seismic waves are reflected; and receiving in said first groups of waves two reference waves reflected from adjacent points in the two corresponding portions of the sub-surface stratum, the time of travel of the two reference waves being substantially the same.

7. In reflection seismic surveying, the process which comprises the steps of: generating at a shotpoint a first set of seismic waves; receiving a first group of said first set of seismic waves at a series of horizontally spaced reception points and a second group of said first set of seismic waves at a series of vertically spaced reception points, said first set of seismic waves being received after reflection from one portion of a sub-surface stratum, the waves in the second group of said first set of seismic waves being reflected from points on the sub-surface stratum that are adjacent points thereon from which some of the first group of said first set of seismic waves are reflected; generating at said shotpoint a second set of seismic waves; receiving a first group of said second set of seismic waves at a second series of horizontally spaced reception points and a second group of said second set of seismic waves at a second series of vertically spaced reception points, said second set of seismic waves being received after reflection from a second portion of a sub-surface stratum, the waves in the second group of said second set of seismic waves being reflected from points on the sub-surface stratum that are adjacent points thereon from which some of the first group of said second set of seismic waves are reflected; and receiving in said first groups of waves two reference waves reflected from adjacent points of corresponding portions of the sub-surface stratum, the time of travel of the reference waves being substantially the same.

8. In reflection seismic surveying, the process which comprises the steps of: generating at a first shotpoint a first set of seismic waves; receiving a first group of said first set of seismic waves at a first series of horizontally spaced reception points that extends over a first horizontal spread that is substantially bisected by said first shotpoint; receiving a second group of said first set of seismic waves at a series of vertically spaced reception points in a vertical spread at one end of said first horizontal spread, said first set of seismic waves being received after reflection from one portion of a sub-surface stratum, the waves in the second group of said first set of seismic waves being reflected from points on the sub-surface stratum that are adjacent points thereon from which some of the first group of said first set of seismic waves are reflected; generating at a second shotpoint at said one end of said first horizontal spread a second set of seismic waves; receiving a first group of said second set of seismic waves at a second series of horizontally spaced reception points that extends over a second horizontal spread that is collinear with said first horizontal spread and is substantially bisected by said second shotpoint, receiving a second group of said second set of seismic waves at a series of vertically spaced reception points at the end of said second horizontal spread that is on the side thereof remote from said first shotpoint, said second set of seismic waves being received after reflection from a second portion of a sub-surface stratum, the waves in the second group of said second set of seismic waves being reflected from points on the sub-surface stratum that are adjacent points thereon from which some of the first group of said second set of seismic waves are reflected; and receiving in said first groups of waves two reference waves reflected from adjacent points of corresponding portions of the sub-surface stratum, the time of travel of the reference waves being substantially the same.

9. In reflection seismic surveying, the process which comprises the steps of: locating a plurality of inertia-type seismometers in a line at a series of horizontally spaced reception points adjacent the surface of the earth, thereby forming a horizontal spread of seismometers, said seismometers being adapted to respond to vibratory movement of the earth; locating a plurality of hydrophones at a series of vertically spaced reception points in a shallow borehole adjacent said horizontal spread of seismometers by suspending said hydrophones at different depths by means of a cable extending into the borehole from the surface of the earth, thereby forming a vertical spread of hydrophones; generating a set of seismic waves at a shot point adjacent the surface of the earth; receiving a first group of said set of seismic waves at the seismometers of said horizontal spread after reflection from a series of relatively closely spaced points of a portion of a subsurface stratum; receiving a second group of said set of seismic waves at the hydrophones of said vertical spread after reflection from a series of relatively closely spaced points of a portion of said sub-surface stratum that is close to said first-mentioned portion; converting vibratory components of the seismic waves received at the respective seismometers of the horizontal spread into corresponding electrical waves; also converting pressure components of the seismic waves received at the hydrophones of said vertical spread into corresponding electrical waves; and recording in a time-coordinated manner only selected frequency components of the electrical waves into which the seismic waves are converted at both the horizontal and vertical spreads, the selected frequency components so recorded from the said vertical spread including some components higher in frequency than the highest components so recorded from said horizontal spread.

10. In apparatus for reflection seismic surveying, a plurality of seismometers located in a line at a series of horizontally spaced reception points adjacent the surface of the earth, and a plurality of hydrophones located at a series of vertically spaced reception points in a shallow borehole that lies adjacent the line of said seismometers; a first plurality of amplifying networks, each having an input and an output, the inputs thereof being connected to the respective seismometers by means of first cables, each of said first amplifying networks comprising a filter having a first characteristic; and a second plurality of amplifying networks, each having an input and an output, the inputs thereof being connected to the respective hydrophones by means of second cables, each of said second amplifying networks comprising a filter having a second characteristic; the characteristics of said filters being such that said second amplifying networks selectively amplify components of received waves some of which have a frequency that is higher than those of the highest components amplified by said first amplifying networks.

11. In apparatus for reflection seismic surveying, a plurality of seismometers located in a line at a series of horizontally spaced reception points adjacent the surface of the earth, and a plurality of hydrophones located at a series of vertically spaced reception points in a shallow borehole that lies adjacent said line of seismometers; a first plurality of amplifying networks including filtering means, each first amplifying network having an input and an output, the inputs thereof being connected to the respective seismometers by means of first cables, the systems including said first amplifying networks and said seismometers having a first band-pass characteristic; and a second plurality of amplifying networks including filtering means, each second amplifying network having an input and an output, the inputs thereof being connected to the respective hydrophones by means of second cables, the systems including said second amplifying networks and hydrophones having a second band-pass characteristic, said second band-pass characteristic having a higher cut-off frequency at the high frequency end thereof than said first band-pass characteristic.

12. In apparatus for reflection seismic surveying, a plurality of seismometers located in a line at a series of horizontally spaced reception points adjacent the surface of the earth, and a plurality of hydrophones located at a series of vertically spaced reception points in a shallow borehole that lies adjacent the line of said seismometers; a first plurality of recording channels, each including a first amplifying network having an input and an output, each of said first recording channels also including one of said seismometers connected by means of a first cable to the input of the first amplifying network thereof, and each first recording channel also including a galvanometer connected to the output of the first amplifying network thereof, each of said first recording channels having a first frequency response characteristic; and a second plurality of recording channels, each including a second amplifying network having an input and an output, each of said second recording channels also including one of said hydrophones connected by means of a second cable to the input of the second amplifying network thereof, each of said second recording channels also including a galvanometer connected to the output of the second amplifying network thereof, each of said second recording channels having a second frequency response characteristic; the characteristics of said recording channels being such that said second recording channels selectively record components of received waves some of which have a frequency that is higher than those of the highest components recorded by said first recording channels.

13. In apparatus for reflection seismic surveying, a plurality of seismometers located in a line at a series of horizontally spaced reception points adjacent the surface of the earth, and a plurality of hydrophones located at a series of vertically spaced reception points in a shallow borehole that lies adjacent said line of seismometers; a first plurality of recording channels, each including a first amplifying network comprising filtering means, each first amplifying network having an input and an output, the inputs thereof being connected to the respective seismometers by means of first cables, and each recording channel also including a galvanometer connected to the output of a corresponding first amplifying network, the systems including said first recording channels and said seismometers having a first band-pass characteristic; and a second plurality of recording channels, each including a second amplifying network comprising filtering means, each second amplifying network having an input and an output, the inputs thereof being connected to the respective hydrophones by means of second cables, each second recording channel also including a galvanometer connected to the output of a corresponding second amplifying network, the systems including said second recording channels and hydrophones having a second band-pass characteristic, said second band-pass characteristic overlapping said first band-pass characteristic and having a higher cut-off frequency at the high frequency end thereof than said first band-pass characteristic.

References Cited in the file of this patent

UNITED STATES PATENTS

| | | |
|---|---|---|
| 1,240,328 | Fessenden | Sept. 18, 1917 |
| 1,909,205 | McCollum | May 16, 1933 |
| 2,259,478 | Morgan | Oct. 21, 1941 |
| 2,276,335 | Peterson | Mar. 17, 1942 |
| 2,279,191 | Adler | Apr. 7, 1942 |
| 2,321,450 | Athy et al. | June 8, 1943 |
| 2,503,904 | Dahm | Apr. 11, 1950 |
| 2,712,124 | Ording | June 28, 1955 |
| 2,718,930 | Bazhaw | Sept. 27, 1955 |